United States Patent [19]

Ratheiser

[11] 4,045,154

[45] Aug. 30, 1977

[54] DIE FOR EXTRUDING LARGE-DIAMETER TUBING

[75] Inventor: Heinz Ratheiser, Vienna, Austria

[73] Assignee: Krauss-Maffei Aktiengesellschaft, Munich, Germany

[21] Appl. No.: 616,306

[22] Filed: Sept. 24, 1975

[30] Foreign Application Priority Data

Sept. 28, 1974 Germany .................. 2446421

[51] Int. Cl.$^2$ .................................... B29D 23/04
[52] U.S. Cl. .................................... 425/467; 264/209; 425/380
[58] Field of Search .................. 72/264, 268, 269; 425/190, 191, 192, 188, 380, 381, 467, 468, 197, 198, 199; 264/209, 176 R

[56] References Cited

U.S. PATENT DOCUMENTS

| 3,321,805 | 5/1967 | Given | 425/192 |
| 3,709,645 | 1/1973 | Mraz | 425/467 X |
| 3,899,276 | 8/1975 | Sokolow | 425/467 X |

FOREIGN PATENT DOCUMENTS

| 20,772 | 9/1968 | Japan | 425/380 |

Primary Examiner—Francis S. Husar
Assistant Examiner—Mark Rosenbaum
Attorney, Agent, or Firm—Karl F. Ross; Herbert Dubno

[57] ABSTRACT

A tube-making die has an outer tube defining a flow axis and having an inner wall centered on the flow axis. A mandrel is supported within the tube by a plurality of radially extending webs and has an outer wall centered on the die axis and turned toward the inner wall. The walls define an annular axially extending flow chamber that is subdivided by the webs into a plurality of passages. At the juncture between the side walls of the webs and the inner and outer walls of the tube and mandrel, respectively, grooves are formed which extend tangentially of the inner and outer walls and/or radially of the side walls of the web.

9 Claims, 7 Drawing Figures

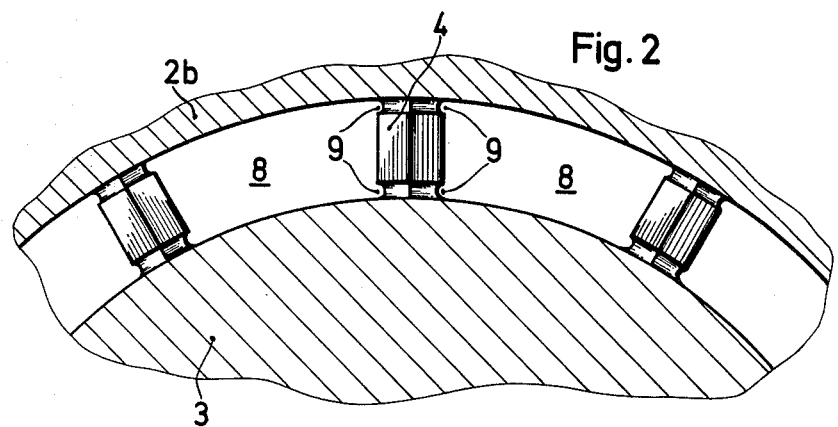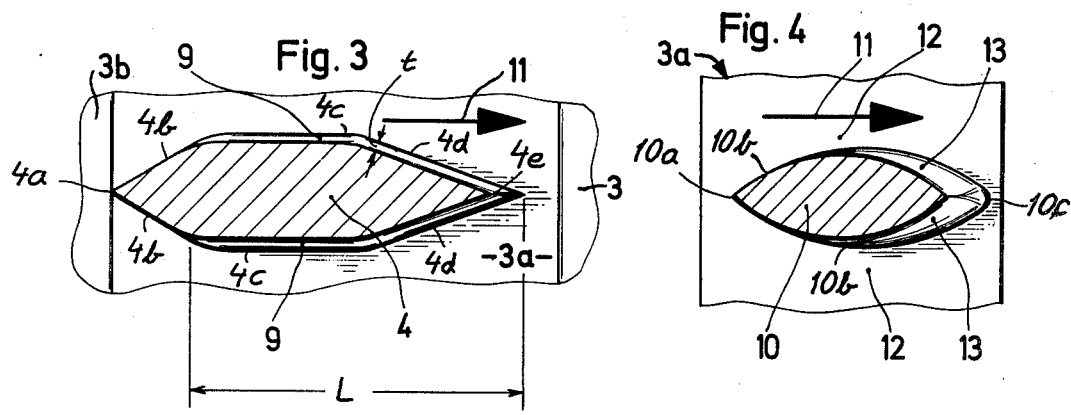

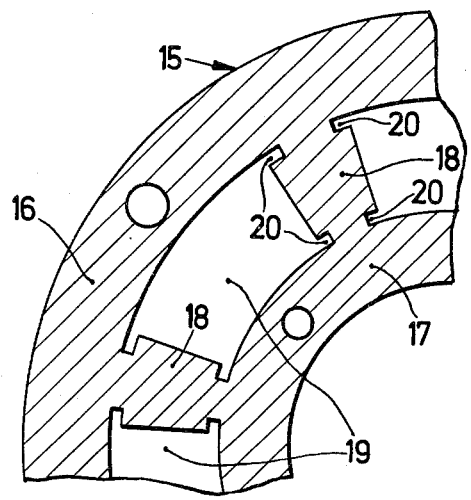
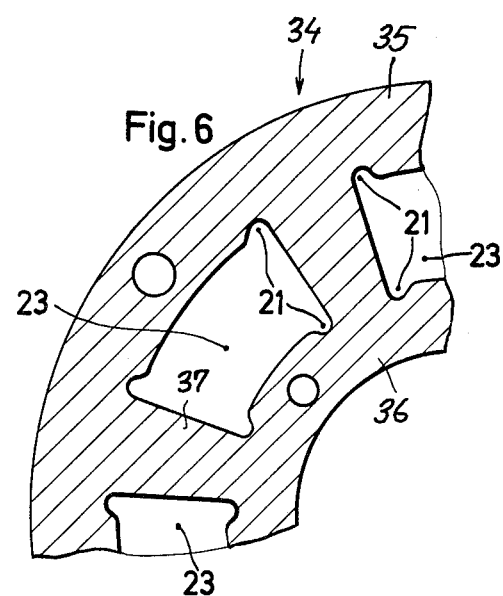
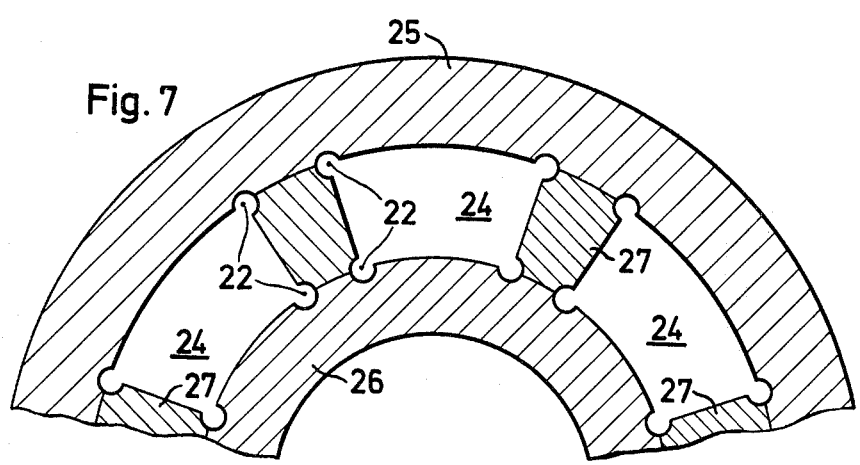

DIE FOR EXTRUDING LARGE-DIAMETER TUBING

FIELD OF THE INVENTION

The present invention relates to a tube-making die. More particularly this invention concerns such a die adapted to be mounted on a synthetic-resin extruder for forming seamless synthetic-resin tubing.

BACKGROUND OF THE INVENTION

A die for extruding a tubing typically comprises three parts: an outer tube or housing, a central mandrel defining within the tube an annular flow chamber, and a plurality of webs extending between the outer tube and the inner mandrel and supporting this mandrel rigidly within the housing. The housing and mandrel are both centered on a die axis and the webs extend radially of this die axis. The webs further subdivide the annular flow chamber into a plurality of angularly spaced and axially extending flow passages.

Plastified synthetic-resin material forced axially into the upstream end of the die is formed into an annular body that is subdivided into a plurality of angularly spaced and axially flowing strands by the webs which support the mandrel in the housing. These strands, still in molten condition after passing the webs, reunite downstream of the webs and form an integral and seamless tube that is extruded from the downstream end of the die, usually into a calibrating sleeve that establishes the outside diameter of the tube as the resin hardens.

In small-diameter tubing the interruptions caused by the webs are almost imperceptible. As the tubing diameter and thickness increases, however, the webs leave axially extending grooves often up to a millimeter or more deep in the tubing. Not only do these grooves give the tubing an unattractive appearance, but they substantially weaken the tubing so that it is less able to withstand internal pressure than would otherwise be the case. Not only does the decrease in wall thickness weaken the tubing, but the webs orient the relatively long synthetic-resin molecules parallel to the axis of the tubing so that the resin itself at these grooves is oriented longitudinally of the tubing and has little transverse strength.

Several attempts have been made to overcome this disadvantage. The most obvious method is simply to lengthen the die considerably, keeping the resin molten for a considerable period of time after it flows around the webs so as to insure its complete homogenization before exiting from the downstream end of the die. Such a construction is very expensive and requires extremely close tolerances, since the support for the mandrel is spaced relatively far from the downstream end of this mandrel. It has also been suggested to form the outside of the mandrel and/or the inside of the housing with helically extending grooves downstream of the webs to insure that the synthetic-resin is mixed and homogenized. In another system the webs are made to extend not strictly axially, but in directions inclined to the axis so as themselves to act as small mixers and homogenize the resin. All of these arrangements have the disadvantage that they required a relatively complicated and, hence, expensive construction of the tube-forming die.

OBJECTS OF THE INVENTION

It is therefore an object of the present invention to provide an improved tube-forming die.

Yet another object is the provision of such a die which is relatively simple and inexpensive to manufacture, which at the same time can be used to make large-diameter thick-wall tubing that does not have the above-described longitudinal wall weakenings.

SUMMARY OF THE INVENTION

These objects are attained according to the present invention in a die of the above-described general type wherein the webs of the spider element supporting the mandrel within the housing extend generally axially and the axially extending side walls of the webs, the inner wall of the housing, or the outer wall of the mandrel are formed at the radial ends of the webs with an axially extending groove. With this system the effective cross-sectional area of the die is increased somewhat at the webs so that when the mass of synthetic-resin material passes these webs the pressure is increased to force the mass together and prevent the formation of the above-described longitudinally extending weak regions. Such a construction is particularly applicable to extruder dies used at high pressure where it is necessary to provide axially elongated webs to rigidly support the mandrel within the housing.

According to other features of this invention the grooves extending axially the full length of the passages are formed at the junction between the side walls of the webs and the inner and outer walls, and may be cut into the respective wall either tangentially or radially. The groove may be of polygonal or part circular section may be of increasing cross-sectional area in the direction of flow through the passage. In accordance with this invention it has been found particularly advantageous to form the grooves principally in the spider element that itself is formed with the webs and connects the outer tube to the inner mandrel.

BRIEF DESCRIPTION OF THE DRAWING

The above and other objects, features, and advantages will become more readily apparent from the following, reference being made to the accompanying drawing in which:

FIGS. 2 and 3 are partial sections taken along line II—II and III—III of FIG. 1 respectively;

FIG. 4 is a view to FIG. 3 illustrating another web structure in accordance with this invention; and FIGS. 5, 6, and 7 are view similar to FIG. 2 illustrating other arrangement in accordance with the present invention.

SPECIFIC DESCRIPTION

Figure 1:
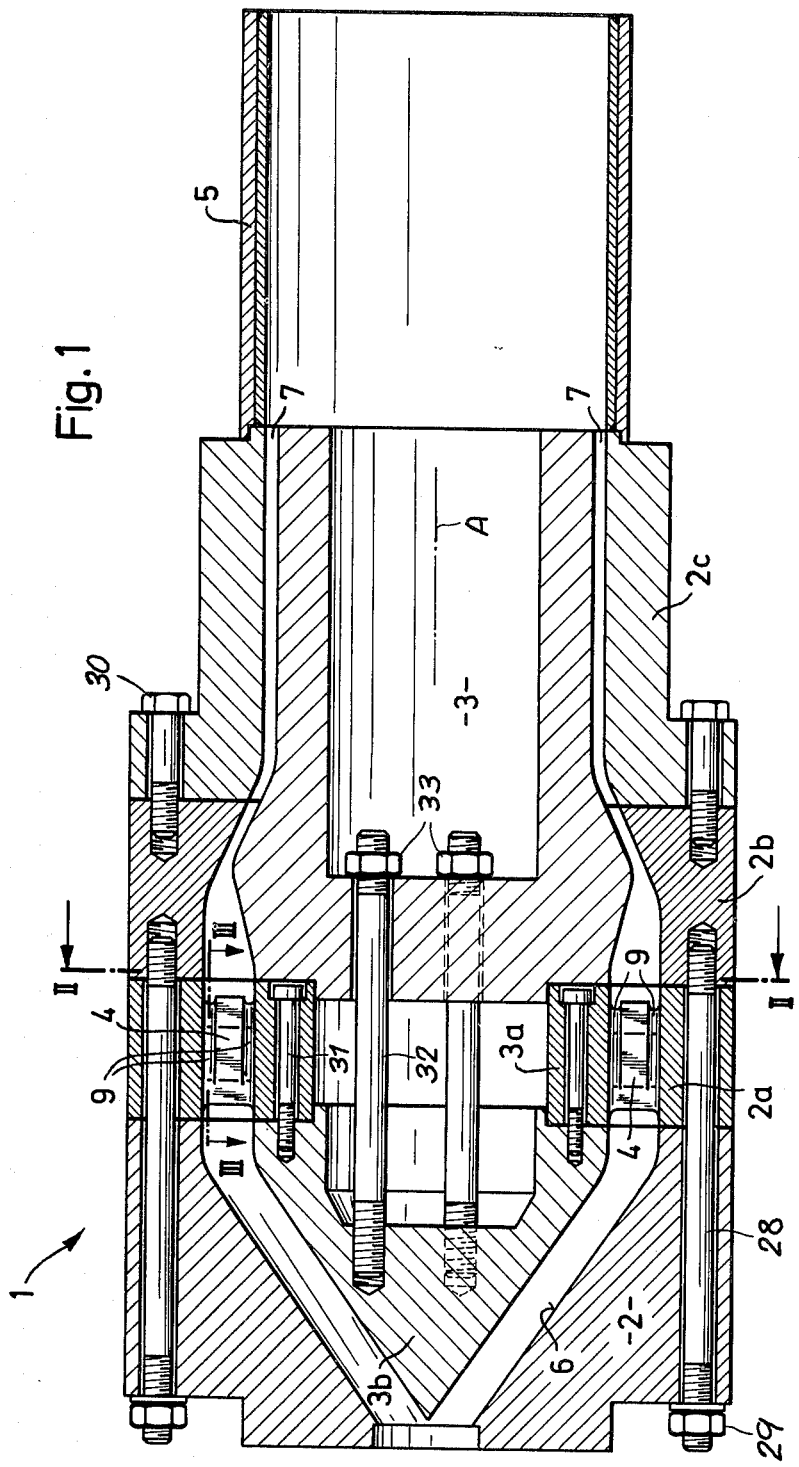
FIG. 1 is an axial longitudinal section through a tube-forming die in accordance with this invention.

As shown in FIGS. 1-3 a die 1 for making large-diameter thick-wall synthetic-resin tubing basically comprises an outer four-part tube 2, 2a, 2b, and 2c surrounding a three-part mandrel 3, 3a, and 3b connected thereto by angularly equispaced webs 4. The outer wall of the mandrel 3-3b and the inner wall of the tube 2-2c define an annular flow passage 6 that is subdivided between the webs 4 into separate angularly equispaced passages 8 (FIG.2) and terminates at its downstream end at a nozzle 7 within an outer-diameter calibrating tube 5.

The tube part 2a, webs 4, and mandrel part 3a are all unitarily formed as a single spider element. The upstream portion 2 of the tube 2–2c is secured to the portion 2b via studs 28 screwed into the portion 2b and carrying nuts 29 clamping the portions 2 and 2a to the portion 2b. Bolts 30 secure the downstream portion 2c to the portion 2b. Similarly bolts 31 secure the mandrel portion 3a, constituting the inner periphery of the spider element, to the axially pointed upstream portion 3b of the mandrel 3–3b, and studs 32 screwed into this portion 3b secure with nuts 33 the downstream portion 3 to the upstream portion 3b, also clamping the portion 3a between these two elements 3 and 3b. All the above-described parts are centered on or parallel to the axis A of the system, and the webs 4 extend radially of this axis.

As shown in FIGS. 2 and 3 each of the webs has at its upstream end a point 4a whence diverge two front side portions 4b continued as median side portions 4c extending parallel to each other and to the axis A. These side walls 4c are continued as converging rear side walls 4d that terminate at the ready end of the web 4 in a point 4e.

FIGS. 2 and 3 further show how each of the webs 4 is formed at both its radial outer end and its radial inner end with grooves 9 extending along the portions 4c and 4d on each side of this web 4. Thus these webs 4 are of substantially greater cross-sectional area at their centers than at their radial ends. Synthetic-resin material flowing as indicated by axial extending arrow 11 in FIG. 3 through the passages 8 therefore can coalesce axially downstream of these webs 4 so as to eliminate the above-described formation of grooves in the tubing. The grooves in the webs have a transverse thickness $t$ and an axial length $L$ equal to at least $5t$.

The arrangment shown in FIG. 4 is substantially identical to that of FIG. 3 except that here webs 10 are provided instead of the webs 4 and define passage 12. These webs 10 have an axially upstream point 10a from which extend two cylindrically arcuate side walls 10b that terminate at the downstream end at a blunt point 10c. This arrangement is formed with grooves 13 that start at the section of maximum width of the webs 10 and extend backwardly with increasing depth.

The arrangment of FIG. 5 shows a spider element 15 having an outer ring 16, an inner ring 17, and webs 18 extending between these rings 16 and 17 and defining passages 19. The webs 18 are formed with square-section grooves 20 extending tangentially of the element's axis and cut only into the webs 18 at the junction between these webs 18 and the rings 16 and 17.

The arrangement of FIG. 6 has a spider element 34 with an outer ring 35, an inner ring 36, and webs 37 between these rings 35 and 36 and defining passages 23. The rings 35 and 36 are formed with grooves 21 adjacent the webs 37, these webs 37 not being cut into at all.

In FIG. 7 an outer ring 25 and an inner ring 26 are bridged by webs 27 that define passages 24. Part-cylindrical grooves 22 are cut into the junctions between the webs 27 and the rings 25 and 26, cut into both of these grooves 22 lie at what would be the junction of the inner wall of the outer ring 25 or the outer wall of the inner ring 26 and the side walls of the webs 27.

I claim:

1. A tube-making die comprising:
   a tube defining a flow axis and having an inner wall centered thereon;
   a mandrel within said tube and having an outer wall centered on said axis and turned toward said inner wall, said walls defining an annular axially extending flow chamber; and
   a plurality of webs extending radially between said tube and said mandrel for supporting said mandrel fixedly within said tube, each of said webs having axially extending side walls defining with said inner and outer walls a plurality of angularly spaced and axially extending passages being formed at the radial end of each of said webs with a groove extending axially of the respective passage, said grooves extending at least from the point of greatest transverse and tangential width of the respective web.

2. The die defined in claim 1 wherein said grooves are partly cut into said inner and outer walls and partly into the respective side walls at the radial ends of the respective webs.

3. The die defined in claim 2 wherein said grooves are part-circular in sectional outline.

4. The die defined in claim 1 wherein said grooves are cut only into said side walls.

5. The die defined in claim 4 wherein said grooves are of rectangular section.

6. The die defined in claim 1 wherein said grooves are cut only into said inner and outer walls.

7. The die defined in claim 1 wherein each groove has a width greater than its depth.

8. The die defined in claim 1 wherein each groove is of increasing cross-sectional area in the axial direction of flow through said passages.

9. A tube-making die comprising:
   a tube defining a flow axis and having an inner wall centered thereon;
   a mandrel spaced within said tube and having an outer wall centered on said axis, said walls defining an annular axially extending flow chamber;
   a plurality of webs angularly spaced about said axis and each extending radially between said walls, said webs each having a pair of axially extending flanks diverging from an upstream location and converging at a downstream location ; and
   a respective groove formed between each of said flanks and the respective walls at each radial end of each of said webs, said grooves extending axially and being traversed by synthetic-resin material extruded through said die between said webs so as to preclude the extruded tube having non-uniformities in regions wherein the synthetic-resin material passes around said webs.

* * * * *